(12) United States Patent
Pathak et al.

(10) Patent No.: US 8,019,794 B2
(45) Date of Patent: Sep. 13, 2011

(54) FIRMWARE REPOSITORY FOR MFP DEVICES

(75) Inventors: Rabindra Pathak, Vancouver, WA (US); Eric Thomas Olbricht, Vancouver, WA (US); Gregory Eugene Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 233 days.

(21) Appl. No.: 11/695,206

(22) Filed: Apr. 2, 2007

(65) Prior Publication Data

US 2008/0243862 A1 Oct. 2, 2008

(51) Int. Cl.
*G06F 17/30* (2006.01)

(52) U.S. Cl. ........ 707/803; 707/802; 707/804; 707/805; 707/806; 707/807; 707/808; 707/809; 707/810; 707/811; 707/604; 707/605; 715/229; 715/234; 715/239

(58) Field of Classification Search .......... 707/604–605, 707/790–795, 802–811; 715/234, 229, 239
See application file for complete search history.

(56) References Cited

U.S. PATENT DOCUMENTS 5,574,899 A 11/1996 Kinoshita
6,055,632 A 4/2000 Deegan et al.
(Continued)

FOREIGN PATENT DOCUMENTS

EP 0632629 A1 4/1995
(Continued)

OTHER PUBLICATIONS

Wei-Meng Lee, Visual Basic 2005 Jumpstart, O'Reilly Media, Inc., ISBN 978-0-596-10071-1, 2005.*
(Continued)

*Primary Examiner* — Frantz Coby
(74) *Attorney, Agent, or Firm* — Larry K. Roberts

(57) ABSTRACT

A firmware repository includes an Extensible Markup Language (XML) description file. A system and method for managing the repository is described.

28 Claims, 10 Drawing Sheets

U.S. PATENT DOCUMENTS

| | | |
|---|---|---|
| 6,341,143 B1 | 1/2002 | Nelson et al. |
| 6,360,362 B1 | 3/2002 | Fichtner et al. |
| 6,526,092 B1 | 2/2003 | Nelson et al. |
| 6,671,802 B1 | 12/2003 | Ott |
| 6,928,108 B2 | 8/2005 | Nelson et al. |
| 6,930,785 B1 | 8/2005 | Weyland et al. |
| 6,950,875 B1 | 9/2005 | Slaughter et al. |
| 6,959,416 B2 | 10/2005 | Manning et al. |
| 6,971,095 B2 | 11/2005 | Hirai et al. |
| 6,976,062 B1 | 12/2005 | Denby et al. |
| 6,976,163 B1 | 12/2005 | Hind et al. |
| 7,093,244 B2 | 8/2006 | Lajoie et al. |
| 2002/0052718 A1 | 5/2002 | Little |
| 2002/0138567 A1* | 9/2002 | Ogawa ........................ 709/203 |
| 2002/0188934 A1 | 12/2002 | Griffioen et al. |
| 2003/0041127 A1 | 2/2003 | Turnbull |
| 2003/0086107 A1 | 5/2003 | Johnson et al. |
| 2003/0217193 A1* | 11/2003 | Thurston et al. .............. 709/321 |
| 2004/0093597 A1 | 5/2004 | Rao et al. |
| 2004/0210894 A1 | 10/2004 | Zarco |
| 2005/0038808 A1* | 2/2005 | Kutch ........................... 707/102 |
| 2005/0102660 A1 | 5/2005 | Chen et al. |
| 2005/0108700 A1 | 5/2005 | Chen et al. |
| 2005/0158100 A1* | 7/2005 | Yamaguchi et al. ............ 400/62 |
| 2005/0270560 A1 | 12/2005 | Ferlitsch |
| 2005/0272417 A1 | 12/2005 | Liu |
| 2006/0174242 A1* | 8/2006 | Zhu et al. ...................... 717/172 |
| 2006/0242578 A1* | 10/2006 | Van Steenbergen et al. . 715/700 |

FOREIGN PATENT DOCUMENTS

| | | |
|---|---|---|
| GB | 2348987 A | 10/2000 |
| WO | WO0017749 A1 | 3/2000 |
| WO | WO02084484 A2 | 10/2002 |
| WO | WO 2006/012533 A2 | 2/2006 |

OTHER PUBLICATIONS

Campbell et al, Introducing Microsoft Visual Basic 2005 for Developers, Microsoft Press, ISBN 978-0-7356-2058-2, 2004.*

* cited by examiner

| Components | Version | | | | |
|---|---|---|---|---|---|
| MFP Firmware | 7.0 | | | | |
| Print Engine Firmware | 7.0 | | | | |
| Copier Firmware | 7.0 | | | | |
| Scanner Firmware | 6.0 | | | | |
| Fax Firmware | 5.0 | | | | |
| Job Accounting Firmware | 4.0 | | | | |
| Compatible Versions Of Components | | *Constituent Firmware Components* | | | | |
| | | Print Engine 7.0 | Copier 7.0 | Scanner 7.0 | Fax 5.0 | Job Accounting 4.0 |
| | Print Engine | | 5.0 or greater | | | 6.5 or greater |
| | Copier | 5.0 or greater | | | | 6.5 or greater |
| | Scanner | | | | 5.5 or less | 6.0 |
| | Fax | | | | | 5.0 |
| | Job Accounting | | | | | |

FIG. 1C

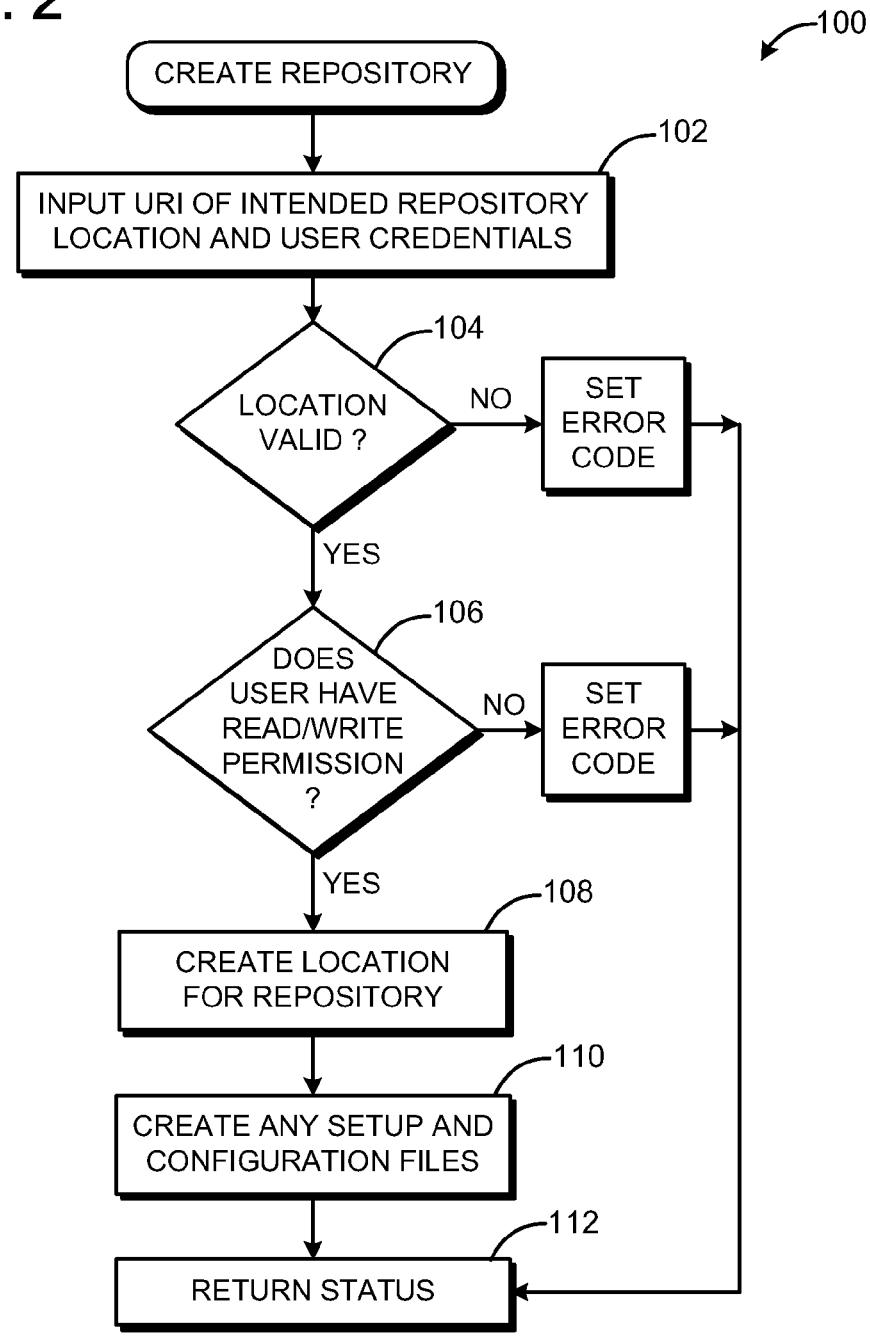

FIRMWARE REPOSITORY FOR MFP DEVICES

BACKGROUND

Many electronic devices today include firmware. Firmware may be a software program or set of instructions programmed on a hardware device. The firmware may provide instructions which are executed to determine how the device operates. The firmware may be stored in memory of a hardware device. As updated firmware is developed, the firmware stored in a device may be replaced or updated.

Existing solutions to manage the firmware (FW) of electronic devices such, for example, multifunction printing (MFP) devices, have many limitations. MFP devices may perform imaging (scanning), printing, copying and facsimile machine functions, or some subset of these functions. FW updates may typically be distributed either on a CD or through a web site. Both the mechanisms have drawbacks. FW distribution through CD is a slow process. It takes time to create and ship the CDs for new firmware updates to individual customers. On the other hand, FW distribution through a web site may be difficult for users to navigate.

BRIEF DESCRIPTION OF THE DRAWINGS

Features and advantages of the disclosure will readily be appreciated by persons skilled in the art from the following detailed description when read in conjunction with the drawing wherein:

FIG. 1C illustrates an exemplary embodiment of a version matrix included in an embodiment of a description file.

FIG. 2 is a flow diagram illustrating an exemplary embodiment of an algorithm for creating a firmware repository.

DETAILED DESCRIPTION

Figure 1:
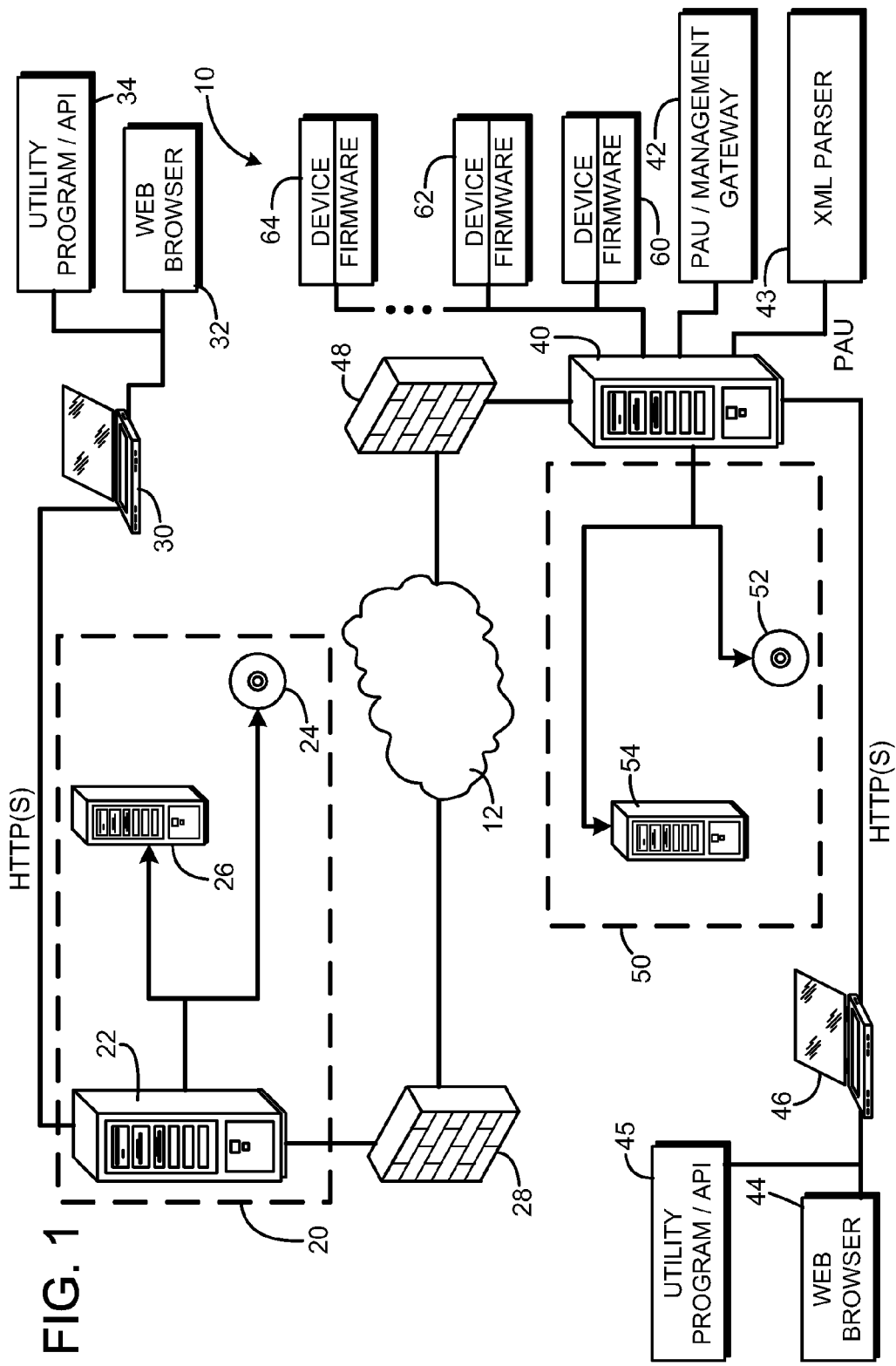
FIG. 1 diagrammatically depicts an exemplary operating environment in which a firmware repository may be utilized.

In the following detailed description and in the several figures of the drawing, like elements are identified with like reference numerals. The figures are not to scale, and relative feature sizes may be exaggerated for illustrative purposes.

A firmware repository may provide a mechanism to distribute firmware releases and make them available to machine dealers and customers in a secure, orderly and error-free manner. A firmware repository may be located on a local resource such as a CD-ROM, network drive or a remote resource accessed through the Internet. FIG. 1 diagrammatically depicts an exemplary operating environment 10 in which a firmware repository may be utilized.

In one exemplary embodiment, the new or updated firmware may be made available through a firmware repository 20 hosted on a web server 22. Users with proper privileges may access, e.g. to manage or browse, this web repository through an HTTP or HTTPS connection via a web browser 32, which may be running, by way of example, on a terminal 30, or via the Internet 12, which may be connected through a firewall 28 to web server 22. Authorized persons may publish new firmware and remove or update existing firmware. The firmware may be obtained from a CD 24 using a CD drive, or from a network storage drive 26, or from another firmware repository.

Customers/users and dealers with required access privileges may access this web repository 20 through a web browser to obtain firmware for a machine. In some applications, access privileges may not be required, so that the firmware update access is freely available to customers/users.

Customer and dealers who are running a management gateway or printer administration utility (PAU) software application 42, running on a console, terminal or server 40 located on a customer's intranet, for example, may have a local firmware repository 50. The terminal 40 is connected on the intranet behind a firewall 48 through which a connection to the Internet 12 is made. A management gateway application and techniques for remote firmware management are described in pending application Ser. No. 11/670,875, entitled "Remote Firmware Management for Electronic Devices," filed Feb. 2, 2007, the entire contents of which are incorporated herein by this reference. A PAU from Sharp Electronics, for example, is a networked printer management tool using standard Simple Network Management Protocol (SNMP) to monitor status and enable remote configuration of networked digital printer and copier devices. This exemplary PAU may be utilized by network administrators for monitoring all Sharp network connected printers and copiers. The utility keeps a constant status check on the devices, warning when some action is necessary by the administrator, for example if paper supply is low, or toner supply is low, or if a periodical service is due, and alerting when a problem has occurred, for example paper jam or toner exhausted. By utilizing the PAU, network administrators can manage all digital printers and copiers remotely via the network from a single console. PAU users can access this local repository 50 to add new firmware and update existing firmware. In the example illustrated in FIG. 1, users of a PAU can obtain new firmware from a local CD 52, a network drive 54 and from the web firmware repository 20, in order to update or install firmware on devices 60, 62, 64. The devices 60, 62, 64 may be multifunction printer (MFP) devices, for example. Thus PAU users will be able to add new firmware to the local repository 50 from a web firmware repository 20 by using a web browser, e.g. a web browser 44 running on a local terminal 46. In an exemplary embodiment, the terminal 46 may be connected to the console 40 through an HTTPS or HTTP connection.

The firmware repository 50 local to the PAU and the web firmware repository 20 are independent of each other, though they use the same technology to store, locate and retrieve the firmware.

A manufacturer may release the new firmware also on CDs. A CD 52 may have the firmware in a local repository 50. In an exemplary embodiment, the PAU will be able to understand the structure of the CD repository. There may also be situations in which a CD may contain the firmware without any also being on a local firmware repository.

Authorized personnel, e.g. those of a device manufacturer, can create the CD with a local repository, e.g. by using a software utility, as described below.

In an exemplary embodiment of a firmware repository, many or all the processes related to the firmware repository may be automated. Automation of the processes in this case may reduce human errors. Most of the processes related to the firmware repository may involve interaction with a computer or computer networks. In an exemplary embodiment, one or more of the following exemplary processes may be carried out programmatically rather than manually. For example, a user may accomplish these functions using a software program or utility, in which the user initiates a given function, and the software carries out the function using inputs provided by the user through a user interface.

1. creation of the repository;
2. creation of a mirror image of the repository;
3. updating the repository with new firmware;
4. removal of firmware from the repository;
5. modification of the existing properties of the firmware in the repository, for example to change the release notes;
6. deletion of the repository; and
7. purging firmware from the repository.

In an exemplary embodiment, activities related to a firmware repository may be automated by a software utility developed using an API (Application Programming Interface). For example, an automation API may be called by to access the firmware repository and make changes to the repository. Those who intend to use the firmware repository in a manual way may do so by using the web browser or client application provided by a device manufacturer or dealer. The firmware repository may be accessed programmatically, e.g. using an API called by a utility program to access and update the firmware repository. This will provide for automation so that the firmware repository may be managed programmatically, e.g., using software utility programs which call an API.

The software utility and API called by the software utility may reside on a console or terminal such as laptop 30, running utility/API 34, and/or on console 46, running utility program 45.

In an exemplary embodiment of a firmware repository, repository automation is XML (Extensible Markup Language) based; the firmware repository may be based on an XML schema which contains the following information:

the firmware version;
the model and family of devices, e.g. multifunction printers (MFPs), supported by the firmware;
the release date of the firmware;
a description or release notes for this version, or a location of the description or location (in an exemplary embodiment, the location will be a URI (Universal Resource Identifier) which will point to a local storage, network storage or web storage);
a location of the firmware (in an exemplary embodiment, the location will be a URI (Universal Resource Identifier) which will point to a local storage, network storage or web storage); and
a version matrix.

Figure 1A:
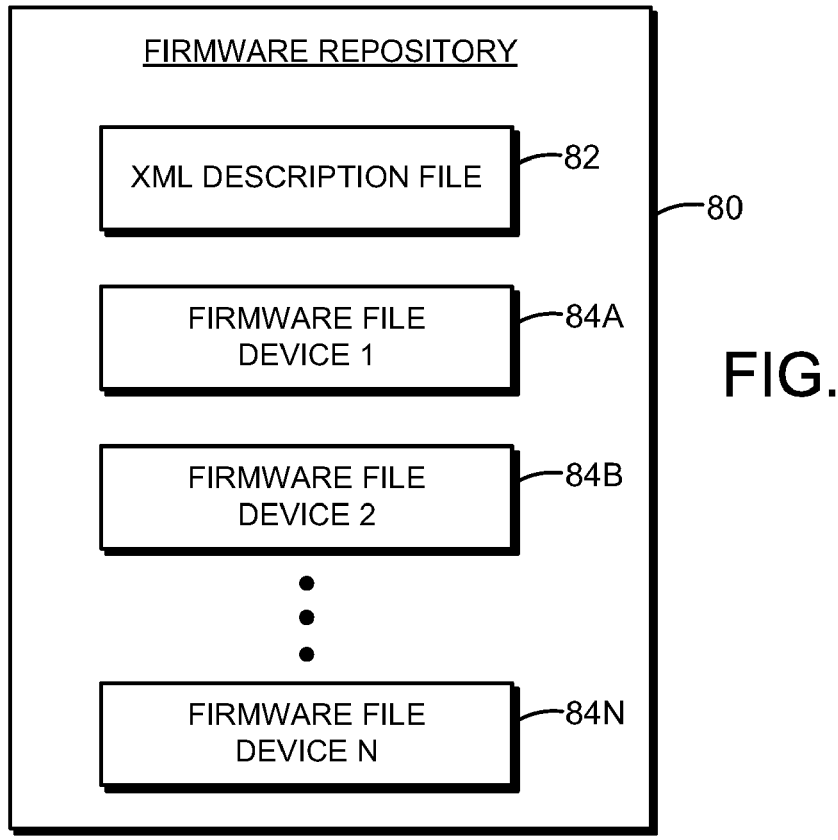
FIG. 1A illustrates schematically an exemplary embodiment of a firmware repository, which may be used in the operating environment depicted in FIG. 1.

FIG. 1A illustrates schematically an exemplary embodiment of a firmware repository 80, which may be used in the operating environment depicted in FIG. 1. The firmware repository 80 may serve as any of repositories 24, 26, 52 or 54 of FIG. 1. The repository 80 is a computer readable media, e.g., a hard drive or server storage, a CD, or any other type of media which may be read by a computer system. The repository 80 includes an XML description file 82, which includes the information set out above for the XML schema. Each user device or terminal, e.g. PAU 40, laptop 30 or laptop 44, will know the location of the firmware repository, and may navigate to the location, e.g. its URI. The firmware repository may include one or more firmware files, depicted as files 84A, 84B, 84N in FIG. 1A. These firmware files contain the actual firmware for a particular device, e.g. device 1, device 2, ... device N. The file format will be that format defined by the device manufacturer.

Figure 1B:
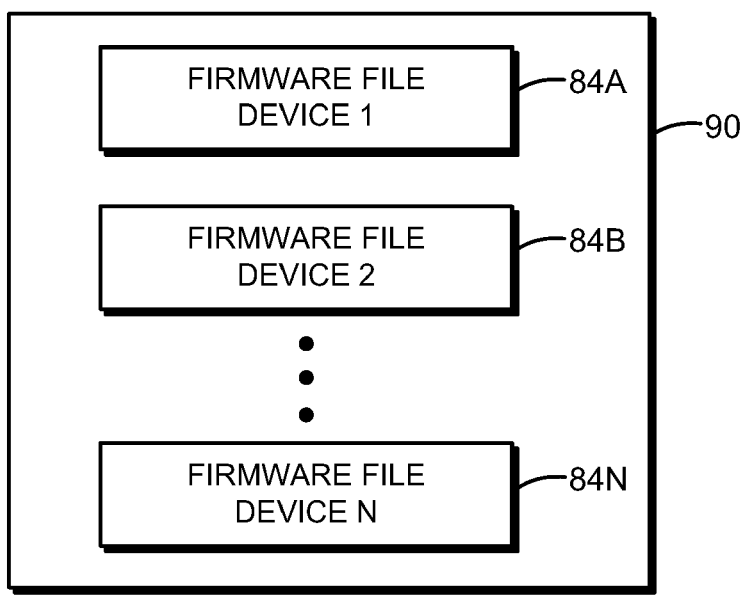
FIG. 1B illustrates schematically an exemplary embodiment of firmware files stored on a computer readable media.

In an exemplary embodiment, the XML description file 82 includes an information field specifying, for each device model, the location of the corresponding firmware file. This location may be on the same computer readable media as the XML description file, or may be a different location. The firmware repository 80 thus could be constructed without any firmware files 84A, 84B, 84N, as the files may be located on another server or computer readable medium, such as medium 90 depicted in FIG. 1B. As an example, repository 80 may be installed on server 26 in FIG. 1, and the firmware files may be located on CD 24, or another remote web server.

An XML parser utility program such as parser 43 (FIG. 1) may be running on a console used to access the firmware repository, read the XML description file, and manage or download firmware files for a given device such as device 60 (FIG. 1). The parser utility program is illustrated in FIG. 1 as installed on server 40, but may also be installed on consoles 40 and 46, for example.

FIG. 2 is a flow diagram illustrating an exemplary embodiment of an algorithm 100 for creating a firmware repository. The exemplary algorithm 100 depicted in FIG. 2 in an exemplary embodiment represents steps implemented by an API called from a software utility. At 102, the user enters an input using a user input screen generated from a software utility on a terminal, e.g. from program 34 on laptop 30 (FIG. 1), which specifies the intended location of the firmware repository. This location may be its Uniform Resource Identifier (URI), i.e. the network or directory path or URL of the intended firmware repository location. Optionally the user credential (user name, password, digital certificates etc.) may also be entered in order to access the URI. Checks are performed at 104 and 106 to determine if the location is valid, and to determine if the user has create/write permission to set up the repository. If not, an error code is set, and operation branches to 112 to return the status. At 108, the location for the repository is created. In an exemplary embodiment, the location may be created using an operating system call, to create a virtual directory on a web server, for example. This is analogous to creation of directories and subdirectories on a PC. At 110, any setup and configuration files are created. The status is then returned at 112. In an exemplary embodiment in which the user called an API to set up the location, the returned status may be a return value of the API call.

Figure 3:
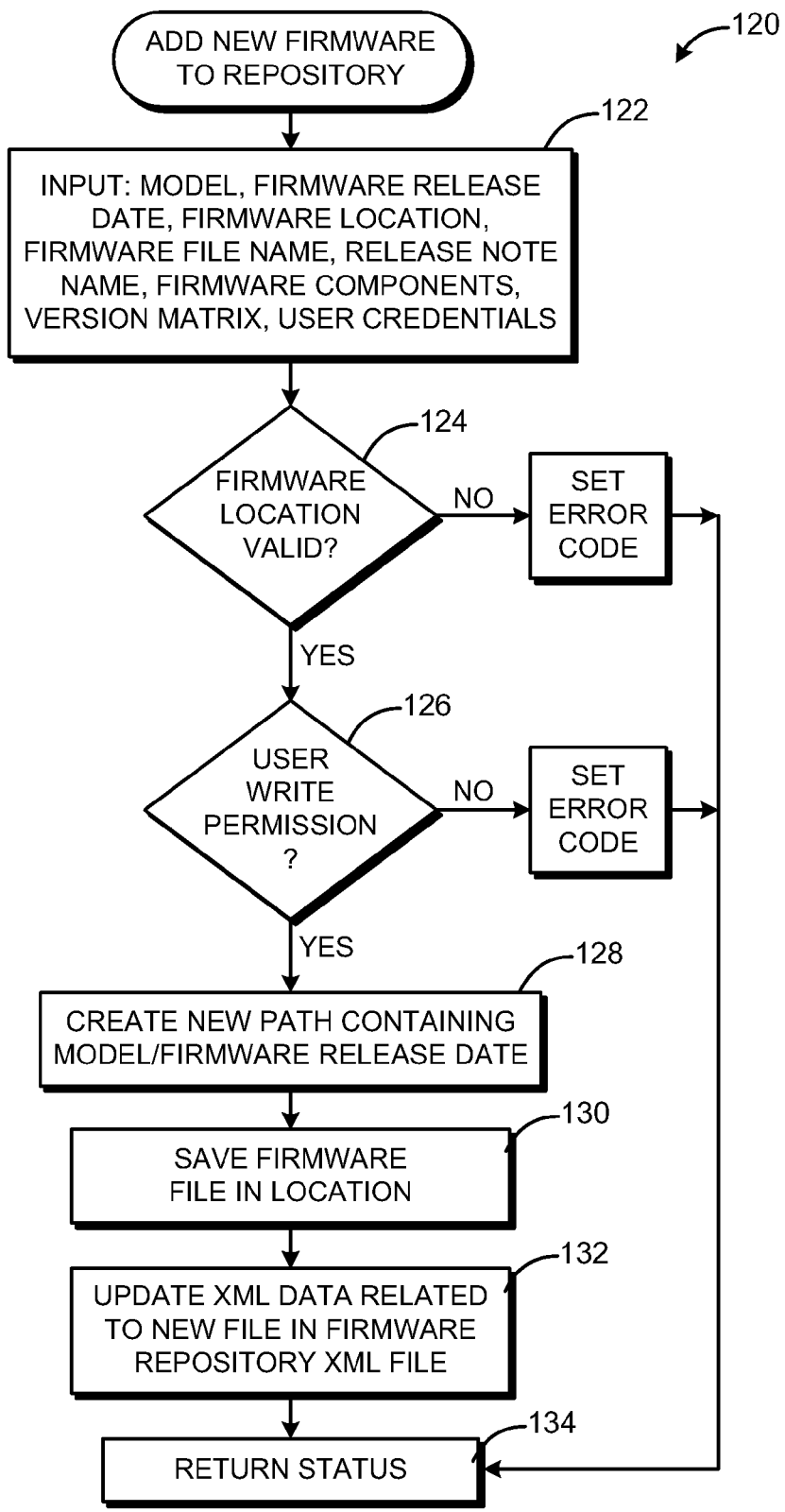
FIG. 3 is a flow diagram illustrating an exemplary embodiment of an algorithm for adding new firmware in a firmware repository.

FIG. 3 is a flow diagram illustrating an exemplary embodiment of an algorithm 120 for adding new firmware in a firmware repository, e.g. one which has been established using the algorithm of FIG. 2. At 122, data is input specifying a device model ("Model"), firmware release date ("FirmwareReleaseDate"), the source location of the firmware (e.g., "MFPFirmwareLocation"), the firmware file name ("FirmwareFileName"), any release note file name ("ReleaseNotesName"), the firmware components ("FirmwareComponents"), and the firmware version matrix ("VersionMatrix"), as well as the credentials of the user seeking to add new firmware to the repository. At 124, the algorithm checks to determine if the MFPFirmwareLocation is valid. This is the location from where input firmware can be obtained. If not, the algorithm sets an error code, and branches to step 134. At 126, the algorithm checks to determine that the user has write permission to write information into the repository; if not, the algorithm sets an error code, and branches to step 134. At 128, the new path or location where new firmware will be added in the repository is created, e.g. containing "Model\FirmwareReleaseDate.". At 130, the firmware file (FirmwareFileName) is saved in the location "Model\FirmwareReleaseDate." At 132, the XML data related to the new firmware file is updated in the firmware repository XML description file. In an exemplary embodiment, the information to be updated in the XML description file is collected from the information provided as inputs to the API call, and this information is updated in the XML description file for that particular firmware. At 134, the status is returned.

Figure 4:
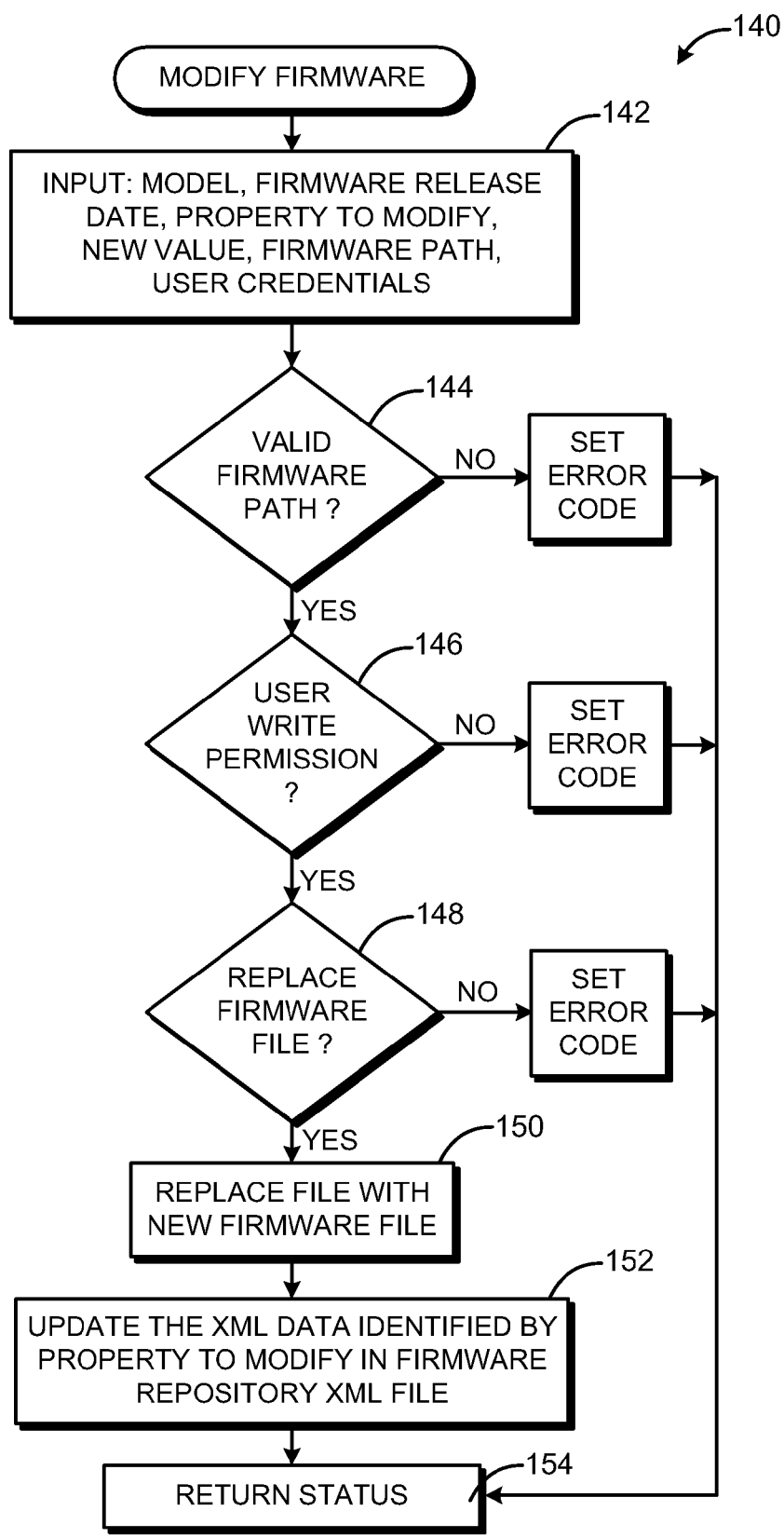
FIG. 4 is a flow diagram illustrating an exemplary embodiment of an algorithm for modifying the properties of a firmware in a firmware repository.

FIG. 4 is a flow diagram illustrating an exemplary embodiment of an algorithm 140 for modifying the properties of a firmware in a firmware repository. At 142, data is input specifying the device model, the firmware release date ("FirmwareReleaseDate"), the firmware property to modify ("PropertyToModify"), and the new firmware property value ("NewValue"). At 144, the algorithm checks to determine if the path containing "Model\FirmwareReleaseDate" exists in the firmware repository; if not, the algorithm sets an error code, and branches to step 154. At 146, the firmware checks to determine if the requester/user has write permission; if not, the algorithm sets an error code, and branches to step 154. At 150, if the firmware-related file needs to be replaced, it is replaced with the new firmware file. One example is to replace an existing firmware file 84A (FIG. 1A) with a new file. Another example is to modify the release notes for a particular firmware, by replacing the release note or release note file with a new release note or file. At 152, the XML data identified by PropertyToModify is updated for the specified firmware file in the firmware repository XML description file. At 154, the status is returned.

Figure 5:
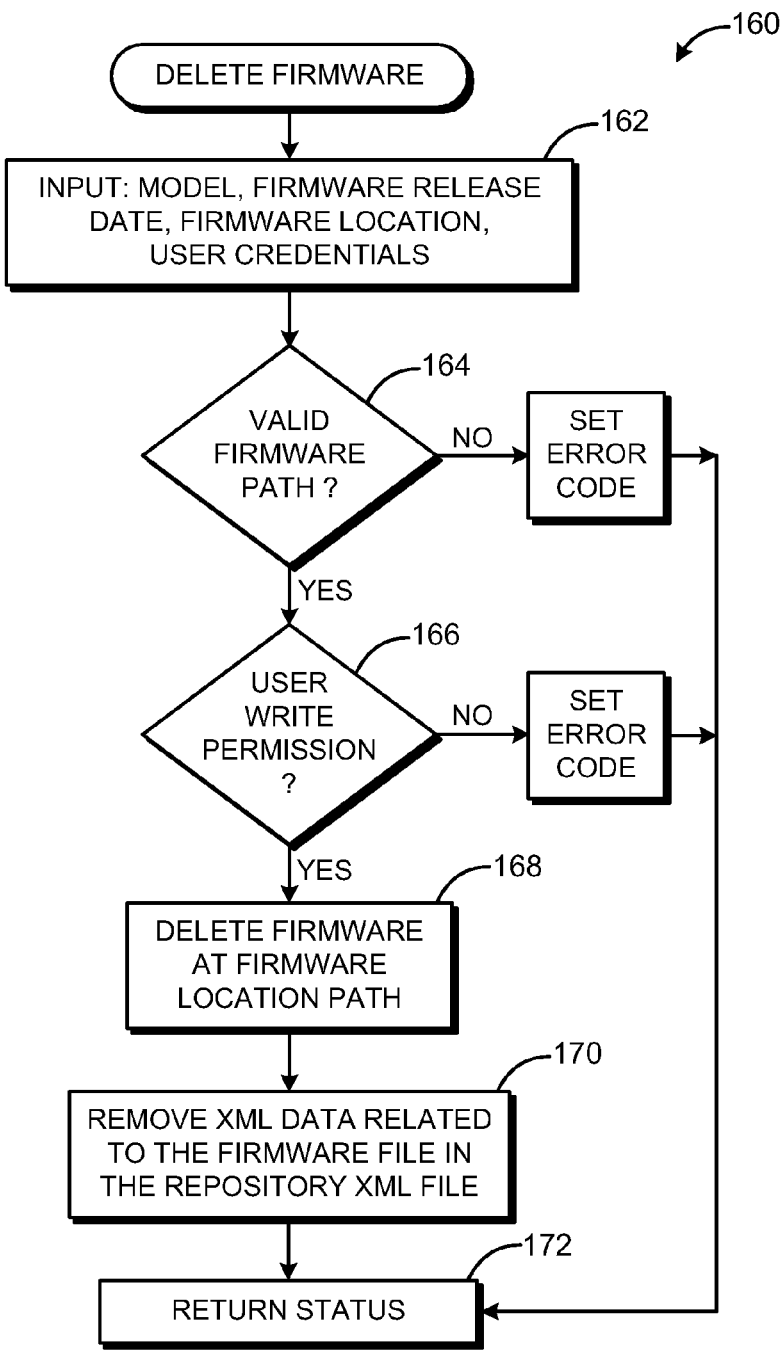
FIG. 5 is a flow diagram illustrating an exemplary embodiment of an algorithm for deleting a firmware from a firmware repository.

FIG. 5 is a flow diagram illustrating an exemplary embodiment of an algorithm 160 for deleting a firmware from a firmware repository. At 162, data is input specifying the device model and firmware release date to be deleted, e.g. "Model" and "FirmwareReleaseDate." At 164, the algorithm checks to determine if the path containing "Model\FirmwareReleaseDate" exists in the repository; if not, the algorithm sets an error code, and branches to step 172. At 166, the algorithm checks to determine if the user has write permission; if not the algorithm sets an error code, and branches to step 172. At 168, the firmware at location "Model\FirmwareReleaseDate" is deleted. At 170, the XML data related to the firmware file in the firmware repository XML file is removed. At 172, the status is returned.

Figure 6:
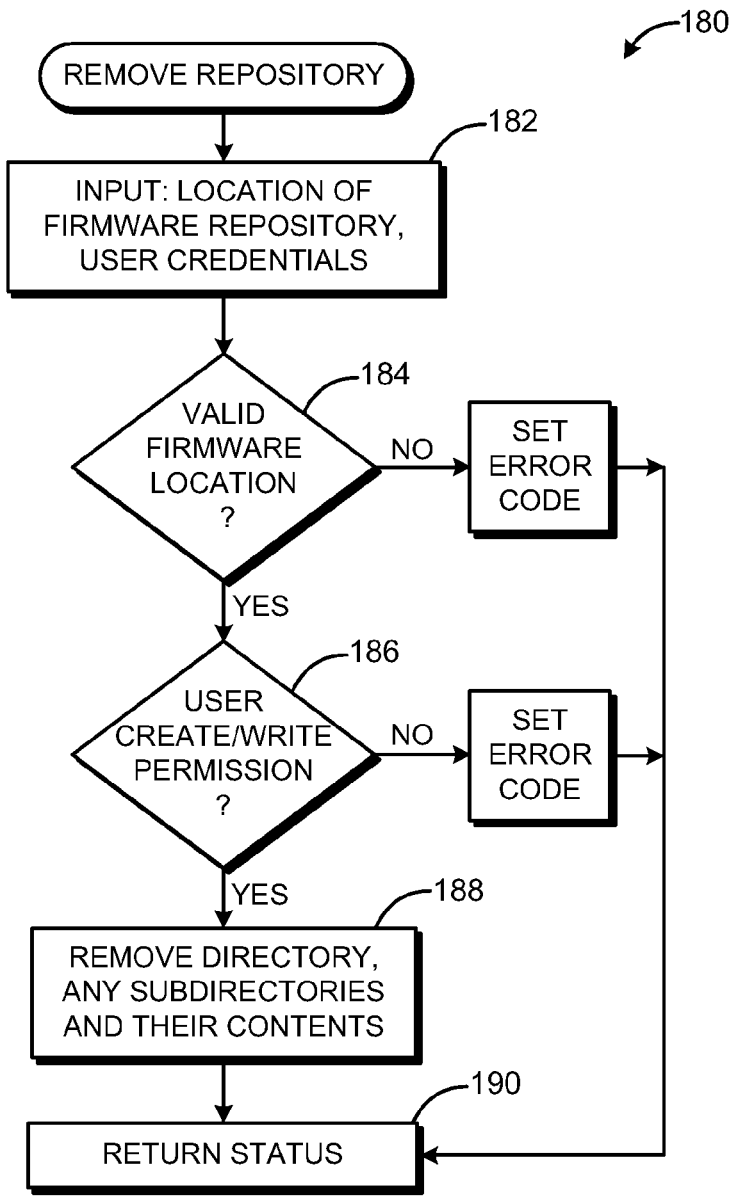
FIG. 6 is a flow diagram illustrating an exemplary embodiment of an algorithm for removing a firmware repository.

FIG. 6 is a flow diagram illustrating an exemplary embodiment of an algorithm 180 for removing a firmware repository. At 182, data specifying the location of the repository to be deleted, i.e. its URI (Network, Directory Path or URL of the intended firmware repository location) is input, with the user credentials. If the firmware location is valid and the user has create/write permission (184, 186), then at 188, the firmware directory as well as any subdirectories and their contents are removed. The status is returned at 190.

Figure 7:
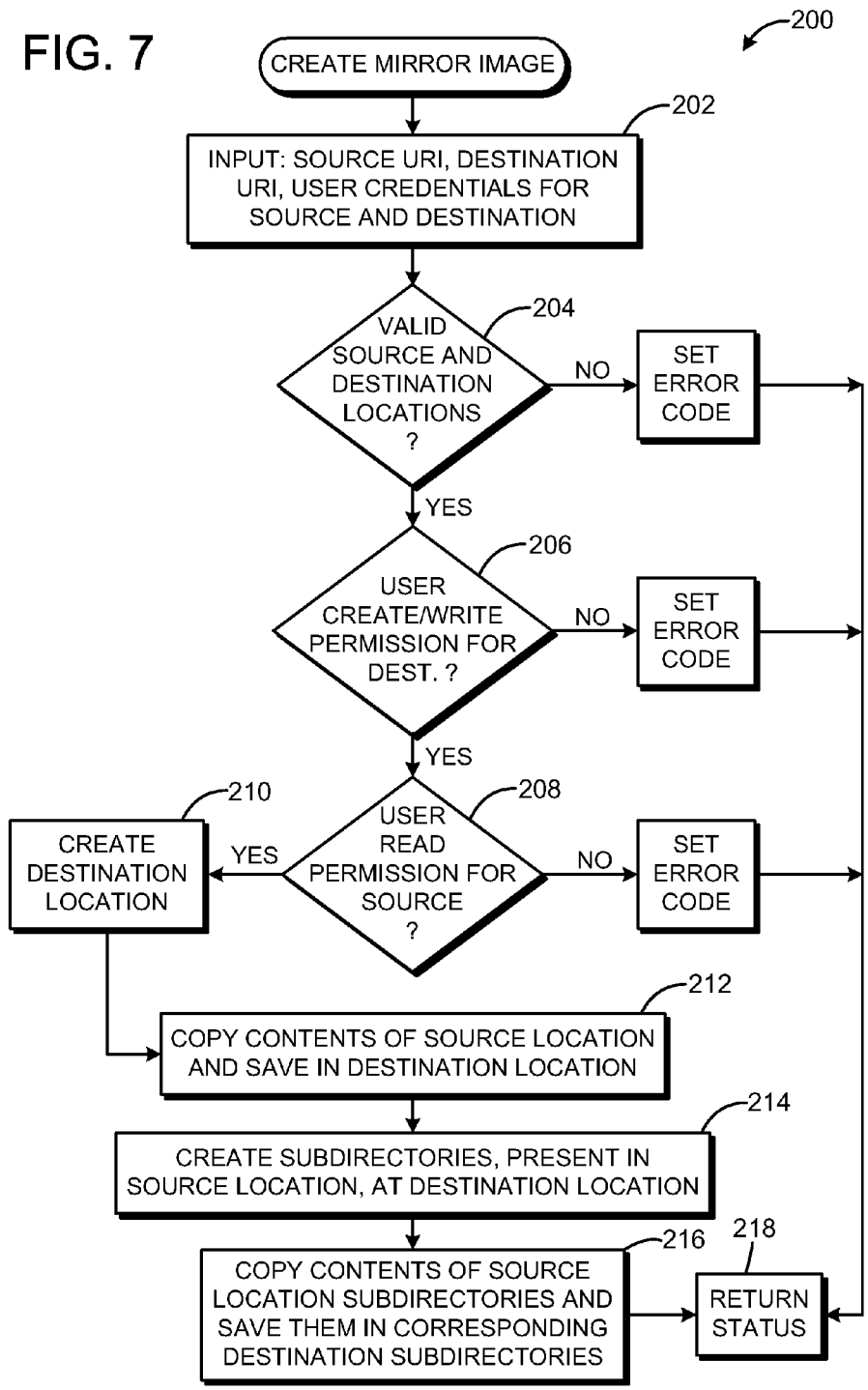
FIG. 7 is a flow diagram illustrating an exemplary embodiment of an algorithm for creating a mirror image of a firmware repository.

FIG. 7 is a flow diagram illustrating an exemplary embodiment of an algorithm 200 for creating a mirror image of a firmware repository. At 202, data is input specifying the source URI (Network, Directory Path or URL of the intended firmware repository location), and the Destination URI. User Credential for both source and destination (Username, password, digital certificates etc in order to access the URI) may also be input. At 204, 206 208, the algorithm checks if the source and destination locations are valid, if the user has create/write permission for the destination location, and if the user has read permission for the source location. If not, an error code is set, and the algorithm branches to 218. If so, at 210, the destination location for the new repository is created. At 212, the contents of the source location are copied and saved in the destination location. At 214, all the subdirectories, present in the source location, are created at the destination location. At 216, the contents of the source location subdirectories are copied and saved in the corresponding destination location subdirectories. The status is returned at 218.

Figure 8:
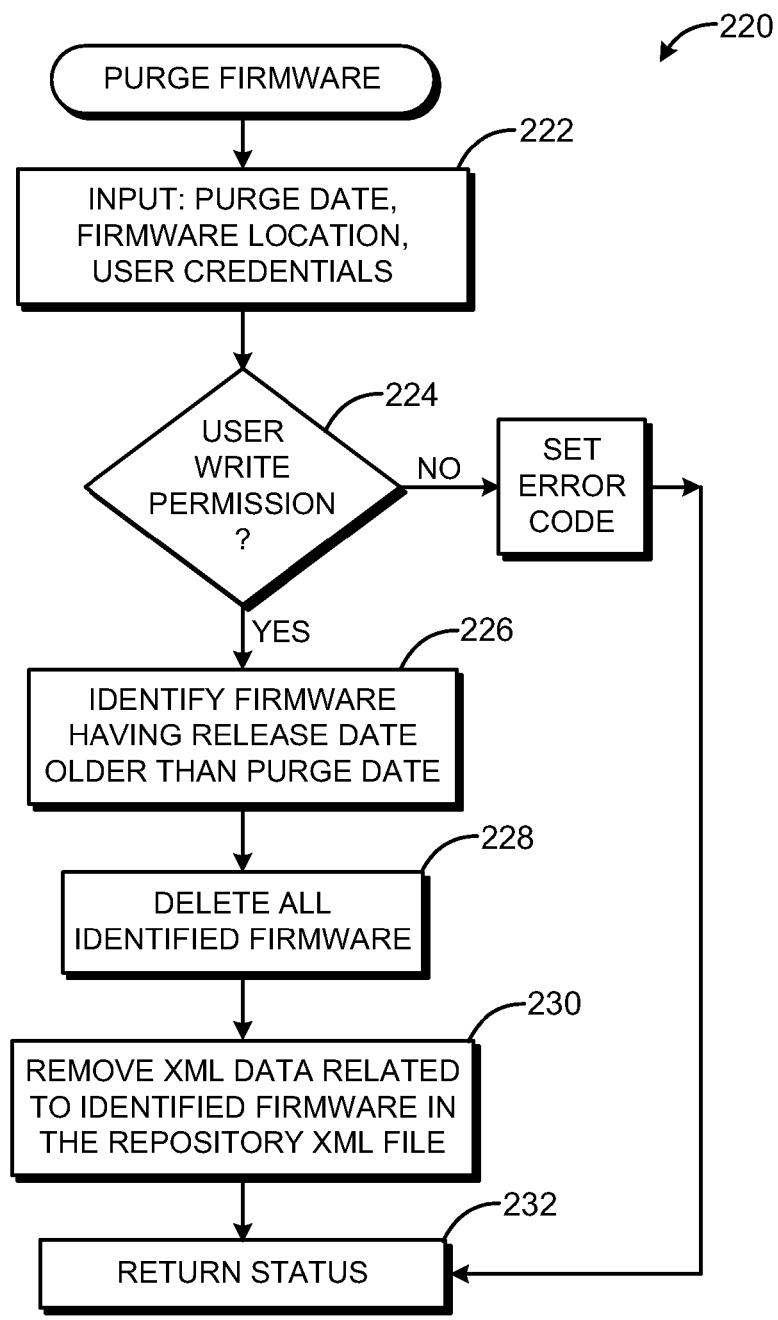
FIG. 8 is a flow diagram illustrating an exemplary embodiment of an algorithm for purging firmware from a firmware repository.

FIG. 8 is a flow diagram illustrating an exemplary embodiment of an algorithm 220 for purging firmware from a firmware repository, identified as PurgeFirmware(PurgeDate). At 222, the purge date ("PurgeDate") is input, with the firmware location and the user credentials. At 224, the algorithm checks if the user has write permission; the algorithm exits is not. At 226, the firmware for which "FirmwareReleaseDate" is older than "PurgeDate" is identified. At 228, all the identified firmware is deleted from the repository. At 230, the XML data related to the identified firmware is deleted in the firmware repository XML file. At 232, the status is returned.

An exemplary embodiment of a firmware repository is stored using an XML schema. An exemplary firmware repository may be accessed using one of the following methods, in an exemplary embodiment:

1. Firmware Repository Web Service: A firmware repository located on web may be implemented using web services. A repository web service can be accessed via a specialized web service API for programmatic access or through a web browser for manual access.

2. Traditional directory structure browsing: User can access an URL and browse the directory structure to locate the firmware of interest and download it.

3. Software Application: If firmware is distributed through CD, then a software application may be used to create and view the repository on CD.

If the firmware repository is located on the network or on a local server then it can be accessed through any of the above mentioned methods.

In order to ensure that only authorized entities access the repository, in an exemplary embodiment, the firmware repository provides one or more of the following security options:

1. Username/password based authentication.
2. Digital certificate based authentication.
3. License key based authentication.

In an exemplary embodiment, a firmware repository may support two types of users. General users or end users may have access to only browse the repository and download the firmware including a version matrix. Advanced or administrative users may have access to all the features including creation, modification and update of the repository and user profile management.

An exemplary embodiment of a firmware repository may include techniques for notifying the registered users when new firmware updates become available. Users can be notified using email or other messaging methods like instant messaging, SMS (Simple Messaging Service), MMS (Multimedia Messaging Service) and paging.

As described above, an XML description file in the firmware repository may include a version matrix for each model or model of devices. An exemplary embodiment of a version matrix is a matrix of version numbers of all the firmware for different components of the whole system. It also contains the interdependencies among the various components. A representation of an exemplary version matrix is depicted in the following table and in FIG. 1C.

| Components | Version |
|---|---|
| MFP Firmware | 7.0 |
| Print Engine Firmware | 7.0 |
| Copier Firmware | 7.0 |
| Scanner Firmware | 6.0 |
| Fax Firmware | 5.0 |
| Job Accounting Firmware | 4.0 |

| | | Constituent Firmware Components | | | | |
|---|---|---|---|---|---|---|
| | | Print Engine 7.0 | Copier 7.0 | Scanner 6.0 | Fax 5.0 | Job Accounting 4.0 |
| Compatible Versions Of Components | Print Engine | | 5.0 or greater | | | 6.5 or greater |
| | Copier | 5.0 or greater | | | | 6.5 or greater |
| | Scanner | | | | 5.5 or less | 6.0 |
| | Fax | | | | | 5.0 |
| | Job Accounting | | | | | |

20

The first part of the table provides the version numbers of the firmware for different components. For example, the version of the released MFP firmware package is 7.0. In this example, the MFP firmware is made up five components—Print Engine firmware, Copier firmware, Scanner firmware, Fax firmware and Job Accounting Firmware. Components of the MFP may have different versions. In this case, even though the MFP firmware version is 7.0; the Fax firmware version is 5.0.

The bottom half of the table in this example of a version matrix provides the compatibility matrix of the version of components. The columns represent the versions of new firmware components. The rows show the versions of old firmware that are compatible with the new firmware versions shown in the columns. For example, Job Accounting version 4.0 in the new firmware is compatible with copier firmware version 6.5 or greater in the old releases.

This dependency relationship is represented as the XML schema, and forms the version matrix. The version matrix is used in making decisions whether to update a particular component on not. For example, if a MFP has Job Accounting firmware with version 3.2 and printer firmware with version 6.7 and someone decides to update the firmware of Job Accounting to 4.0 then he also has to update the print engine firmware to 7.0 otherwise, Job Accounting firmware will not work properly.

The following is an exemplary sample XML schema for a firmware repository, for example an XML schema for an XML description file 82 as described above regarding FIG. 1A.

```
<?xml version="1.0" encoding="utf-8"?>
<xs:schema attributeFormDefault="unqualified" elementForm Default="qualified" version="1.0"
  xmlns:xs="http://www.w3.org/2001/XMLSchema">
  <xs:element name="AllFirmware">
    <xs:complexType>
      <xs:sequence>
        <xs:element maxOccurs="unbounded" name="Model">
          <xs:complexType>
            <xs:sequence>
              <xs:element maxOccurs="unbounded" name="Firmware">
                <xs:complexType>
                  <xs:sequence>
                    <xs:element name="FirmwareReleaseDate" type="xs:date" />
                    <xs:element name="MFPFirmwareLocation" type="xs:anyURI" />
                    <xs:element name="FirmwareFileName" type="xs:string" />
                    <xs:element name="ReleaseNoteName" type="xs:string" />
                    <xs:element name="FirmwareComponents">
                      <xs:complexType>
                        <xs:sequence>
                          <xs:element maxOccurs="unbounded" name="Component" type="xs:string" />
                        </xs:sequence>
                      </xs:complexType>
                    </xs:element>
                    <xs:element name="VersionMatrix">
                      <xs:complexType>
                        <xs:sequence>
                          <xs:element maxOccurs="unbounded" name="MFPComponent">
                            <xs:complexType>
                              <xs:sequence>
                                <xs:element name="Name" type="xs:string" />
                                <xs:element name="Version" type="xs:string" />
                                <xs:element name="ReleaseDate" type="xs:date" />
                                <xs:element name="FirmwareFile" type="xs:string" />
                                <xs:element name="ReleaseNote" type="xs:string" />
                                <xs:element name="FirmwareLocation" type="xs:anyURI" />
```

```
            <xs:element name="CompatibleWith">
                <xs:complexType>
                    <xs:sequence>
                        <xs:element maxOccurs="unbounded" name="SubComponent">
                            <xs:complexType>
                                <xs:sequence>
                                    <xs:element name="ComponentName" type="xs:string" />
                                    <xs:element name="CompatibleVersion" type="xs:string" />
                                </xs:sequence>
                            </xs:complexType>
                        </xs:element>
                    </xs:sequence>
                </xs:complexType>
            </xs:element>
        </xs:sequence>
    </xs:complexType>
</xs:element>
                        </xs:sequence>
                        <xs:attribute name="FirmwareVersion" type="xs:string" use="required" />
                    </xs:complexType>
                </xs:element>
            </xs:sequence>
            <xs:attribute name="ModelName" type="xs:string" use="required" />
        </xs:complexType>
    </xs:element>
 </xs:sequence>
</xs:complexType>
</xs:element>
</xs:schema>
```

The following is an exemplary sample XML description file for a firmware repository. This example relates to two particular device models, identified as MX-3501N and AR-M700U.

As illustrated in the foregoing example, the XML description file may include information for each subcomponent of the system may include an identification of the firmware for that component, as well as information such as the location of the subcomponent firmware file.

An exemplary embodiment of a repository for firmware updates may provide one or more of the following capabilities:

Well defined location and storage structure to archive the firmware updates for electronic devices, e.g., MFP devices.

Automation of repository creation and the process for populating the repository with firmware updates.

For the devices with multiple sub-components where each component requires a separate firmware, there may be a need to update more than one firmware at the same time. Firmware for different components may have interdependencies. They may have dependency on the order in which the firmware for components is upgraded. Additionally they might have dependency across versions. A particular version of one component may only work with a particular version of firmware for another component. An exemplary embodiment of a firmware repository provides a structure which captures a matrix of firmware versions for different components and their interdependencies.

Algorithms to manage the repository, e.g. removing elements, purging the repository periodically and deleting the repository if needed.

Exemplary embodiments of a firmware repository and management system may include one or more of the following features:

1. XML schema for the structure of the firmware repository.
2. Algorithm to automate the process of creating and populating the firmware repository.
3. Algorithm to create mirror images of a repository.
4. Algorithm to modify/delete the repository—to remove the elements and to purge the repository periodically.
5. Secure and restricted access to repository.
6. Version matrix to capture the inter-dependencies of firmware for different components across different versions.

Although the foregoing has been a description and illustration of specific embodiments of the invention, various modifications and changes thereto can be made by persons skilled in the art without departing from the scope and spirit of the invention as defined by the following claims.

What is claimed is:

1. A computer system, comprising:
a computer readable medium including a firmware repository;
and wherein the firmware repository stores at least one Extensible Markup Language (XML) description file employing an XML schema which identifies for a firmware associated with the firmware repository a firmware version, a device supported by the firmware, and a location of the firmware, and wherein the XML schema further identifies for the firmware associated with the firmware repository a version matrix comprising a matrix of version numbers of all the firmware for different components of said device and a set of interdependencies among the different components of said device, and wherein the firmware is contained in a firmware file separate and distinct from the XML description file;
a utility program installed on a computer console to access the firmware repository, read the XML description file, and manage or download firmware files for a given device.

2. The computer system of claim 1, wherein said location of the firmware comprises a Universal Resource Identifier (URI) which points to a local storage, network storage or web storage.

3. The computer system of claim 1, wherein said device is a multifunction printer.

4. The computer system of claim 3, wherein said firmware comprises:
- a print engine firmware component;
- a copier firmware component; and
- a scanner firmware component;
- and wherein the XML description file includes, for each said component, an identification of the firmware for each of said components and a location of a component firmware file for each of said components.

5. The computer system of claim 1, wherein said medium is a computer hard drive memory or a compact disk.

6. The computer system of claim 1, further comprising said firmware file containing the firmware.

7. The computer system of claim 1, wherein said firmware location is a remote computer readable medium distinct from said computer readable medium on which said description file is stored.

8. A computer system for managing device firmware, comprising:
- a firmware repository and wherein the firmware repository includes at least one Extensible Markup Language (XML) description file which contains the following information for a firmware contained in a firmware file distinct from the XML description file:
- a firmware version;
- a device model and family of devices supported by the firmware;
- a release date of the firmware;
- a description or release notes for said version;
- a location of the firmware; and
- a version matrix comprising a matrix of version designations of all the firmware for different components of said device and a set of interdependencies among the different components of said device; and
- a utility program installed on a computer to access the firmware repository, read the XML description file, and in dependence on the information in the XML description file, manage or download firmware files for a given device.

9. The computer system of claim 8, wherein said location of the firmware comprises a Universal Resource Identifier (URI) which points to a local storage, network storage or web storage.

10. The computer system of claim 8, wherein said family of devices is a family of multifunction printers (MFPs).

11. The computer system of claim 10, wherein said firmware components comprise:
- a print engine firmware component;
- a copier firmware component; and
- a scanner firmware component;
- and wherein the XML description file includes, for each said component, an identification of the firmware for each of said components and a location of a component firmware file for each of said components.

12. The computer system of claim 8, wherein said firmware repository resides on a computer hard drive memory or a compact disk.

13. The computer system of claim 8, further comprising a firmware file containing the firmware.

14. The computer system of claim 8, wherein said firmware location is a remote computer readable medium distinct from said computer readable medium on which said description file is stored.

15. A computer-implemented system for managing a firmware repository including a device firmware file for a device having a plurality of components, the device firmware file stored at a device firmware file location; the system comprising:
- an Extensible Markup Language (XML) firmware description file stored on computer readable media at a firmware repository location, the firmware description file employing an XML schema which identifies for the firmware file a firmware version, a device supported by the firmware, a version matrix comprising a matrix of version numbers of each component firmware for the plurality of components of the device and interdependencies among the plurality of components, and said location of the device firmware file, and wherein the device firmware file is distinct from the XML description file;
- a software utility on a computer console, the software utility adapted to manage the firmware repository including the XML description file, to access the firmware repository, read the XML description file, and manage or download firmware files for a given device, said software utility including an algorithm for receiving and acting upon an input data set to manage said firmware repository, said input data set including a firmware repository location data element identifying said firmware repository location.

16. The system of claim 15, wherein said algorithm is adapted to create a firmware repository, the algorithm adapted to create said firmware repository location and to create any setup or configuration files for the firmware repository at said firmware repository location.

17. The system of claim 15, wherein said firmware repository location is a local storage, network storage or web storage location identified by a Universal Resource Identifier (URI).

18. The system of claim 15, wherein said algorithm is adapted to add a new firmware file to said firmware repository, the algorithm adapted to create a new path containing a model and firmware release date, to save the new firmware file at a location defined by said path, and to update XML data related to the new firmware file in said firmware XML description file.

19. The system of claim 15, wherein said algorithm is adapted to modify a firmware file associated with said repository, the algorithm adapted to input data relating to said firmware file to be modified, to replace said firmware file in said repository with a new firmware file, and to update XML data related to the firmware file in said firmware XML description file.

20. The system of claim 15, wherein said algorithm is adapted to delete a firmware file associated with said repository, the algorithm adapted to input data relating to said firmware file to be deleted, to delete said firmware file, and to remove XML data related to the deleted firmware file in said firmware XML description file.

21. The system of claim 15, wherein said algorithm is adapted to delete a firmware repository at said firmware repository location, the algorithm adapted to remove a directory, any subdirectories and contents at said firmware repository location.

22. The system of claim 15, wherein said algorithm is adapted to purge firmware associated with said repository, the algorithm adapted to input data relating to said firmware to be purged, including a purge date and a firmware location, to identify firmware having a release date older than said purge date, and to delete all identified firmware, and to remove XML data related to the deleted firmware in said firmware XML description file.

23. The system of claim 15, wherein said algorithm is adapted to create a mirror image of a firmware file associated with said firmware repository, the algorithm adapted to input data related to the firmware file including a source location and a destination location, to copy contents of said source location and to save the contents in the destination location.

24. The system of claim 15, wherein said software utility application is adapted to call an application programming interface (API) which implements said algorithm.

25. The computer system of claim 15, wherein said device is a multifunction printer device, and said component firmware comprises:
   a print engine firmware component;
   a copier firmware component; and
   a scanner firmware component;
   and wherein the XML description file includes, for each said component, an identification of the firmware for each of said components and a location of a component firmware file for each of said components.

26. A computer-implemented method for managing a firmware repository, comprising:
   inputting a firmware repository location and user credentials;
   verifying that the firmware repository location is a valid location and the user credentials provide a valid management permission;
   if the location is a valid location and the user credentials provide a valid management permission, conducting a computer-implemented management function on an Extensible Markup Language (XML) firmware description file stored on computer readable media at the firmware repository location, the firmware description file including a field defining a device firmware file location at which a device firmware file is located, a device supported by the device firmware file, a version matrix comprising a matrix of version numbers of each component firmware for a plurality of components of the device and interdependencies among the plurality of components, and wherein the device firmware file is distinct from the XML description file.

27. The method of claim 26, wherein said firmware repository location is a local storage, network storage or web storage location identified by a Universal Resource Identifier (URI).

28. The method of claim 26, wherein said conducting said computer-implemented management function comprises initiating a given function selected from a set of functions, and carrying out the function using inputs provided by a user through a user interface, and the set of functions includes the following functions:
   creation of the repository;
   creation of a mirror image of the repository;
   updating the repository with new firmware;
   removal of firmware from the repository;
   modification of an existing property of a firmware in the repository;
   deletion of the repository; and
   purging firmware from the repository.

* * * * *